United States Patent [19]

Favache et al.

[11] Patent Number: 4,738,651
[45] Date of Patent: Apr. 19, 1988

[54] STEPLESSLY ADJUSTABLE BELT-TYPE TRANSMISSION

[75] Inventors: Serge Favache, Zweibrücken; Bernd Kempf, Althornbach; Karl Rabung, Gersheim, all of Fed. Rep. of Germany

[73] Assignee: Deere & Company, Moline, Ill.

[21] Appl. No.: 933,706

[22] Filed: Nov. 21, 1986

[30] Foreign Application Priority Data

Nov. 22, 1985 [EP] European Pat. Off. ........... 85114826

[51] Int. Cl.⁴ ............................................ F16H 11/06
[52] U.S. Cl. ......................................... 474/19; 474/33
[58] Field of Search ...................... 474/19, 17, 29, 30, 474/69, 70, 101, 32–36

[56] References Cited

U.S. PATENT DOCUMENTS 3,628,390  12/1969  van der Lely et al. .......... 474/33 X
3,881,370  5/1975  Vogelaar et al. .................. 474/19 X
4,400,930  8/1983  Huhman et al. .................... 474/19 X

FOREIGN PATENT DOCUMENTS 1500371  6/1969  Fed. Rep. of Germany .

Primary Examiner—Stephen J. Novosad
Assistant Examiner—Thuy M. Bui

[57] ABSTRACT

An infinitely variable belt-type transmission for an agricultural machine or the like includes drive and driven pulleys and a pair of inversely variable diameter pulleys mounted on a shaft that is shiftable to vary the diameter of the pulleys and consequently the drive ratio of the transmission. The inner halves of the adjacent variable diameter pulleys are drivingly connected through a cam that exerts a force on the inner pulley halves tending to increase the pulley diameters and thereby increase the belt tension in response to an increase in torque transmitted through the transmission, and the shiftable pulley half on at least one of the pulleys is splined to its mating half so that the shifting movement in response to the torque increase results only in axial motion of the shiftable pulley half.

7 Claims, 11 Drawing Sheets

Fig. 8
Fig. 6
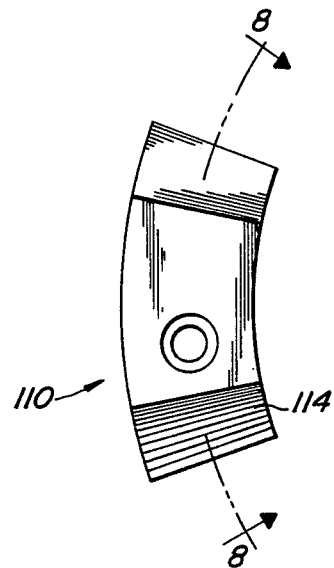
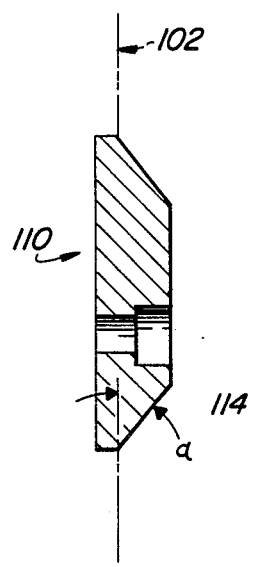
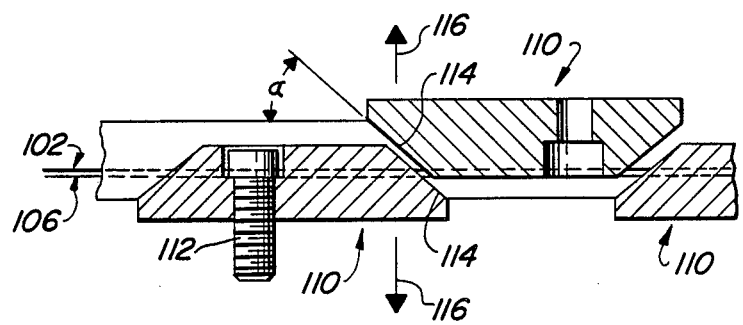
Fig. 7

4,738,651

STEPLESSLY ADJUSTABLE BELT-TYPE TRANSMISSION

BACKGROUND OF THE INVENTION

The invention relates to a steplessly adjustable belt-type transmission, in particular for agricultural machines, comprising at least one belt pulley at the input and output sides respectively, wherein at least one pulley half can be non-rotatably connected to a shaft while the other pulley half is axially displaceably mounted on the shaft, with which there are associated mutually coaxially aligned interengaging cam elements which are displaced relative to each other in dependence on the variable torque and which vary the frictional pressure as between the belt and the belt pulley.

A steplessly adjustable belt-type transmission for combine harvesters is known (West German Pat. No. 1,500,371) which is provided with belt pulleys at the input and output sides, as well as an intermediate pulley which is variable in respect of the effective diameters thereof and which is mounted on a pivotable support arm. In that arrangement, the support arm is mounted within the lower belt transmission and serves for pivotal movement of the intermediate pulley which is in the form of a double V-belt pulley so that, upon a reduction in the effective diameter of the one V-belt pulley, the effective diameter of the other V-belt pulley is necessarily increased. Depending on the one V-belt pulley of the intermediate pulley arrangement, the pulley at the output side is necessarily varied in respect of its effective diameter. That arrangement does not make it possible to provide for optimum belt tension. The known arrangement, in connection with the support arm, serves for varying the transmission ratio of the transmission assembly.

Also known is a three-shaft, steplessly adjustable belt-type transmission for combine harvesters (U.S. Pat. No. 3,881,370) which is provided with a belt pulley at the input side, which pulley is drivingly connected by way of a first belt to a second non-adjustable belt pulley which is disposed on a driven intermediate shaft. Arranged beside that second pulley on the intermediate shaft is a third pulley whose running or pitch circle diameter is variable and which is drivingly connected by way of a second belt to a fourth adjustable pulley. The one V-belt pulley half of the fourth pulley is automatically displaced in the axial direction by way of a cam control means, in dependence on the increase in torque, so that the running circle diameter and thus the belt tension are adjustable. The cams comprise conical cam elements which are in engagement with each other and which can move relative to each other. Such an arrangement for controlling the pulleys is very costly and is therefore used in particular in transmissions which are required to transmit high levels of torque. Adjustment of the central pulley by means of a pivot fork is more cost-effective than adjustment of the central pulley by means of a hydraulic motor. However, slip occurs more easily in respect of the intermediate pulley which is arranged on the fork.

SUMMARY OF THE INVENTION

The object of the present invention is to adjust the belt pulleys to optimum belt tension by means of the cam elements in such a way that abrasion wear is reduced to a minimum.

That object is achieved in that the pulley half which is axially displaceable by way of the cam elements is non-rotatably connected to the associated second pulley half by way of a spline arrangement.

As the axially displaceable pulley is also drivingly connected by means of a spline arrangement to the pulley which is non-rotatably connected to the shaft, when the torque rises the belt pulley is axially displaced and thus the contact pressure or rubbing pressure between the face of the belt and the inward surface of the adjustable pulley is increased. In that connection, the arrangement ensures at the same time that the two mutually oppositely disposed pulley halves of a pulley are not displaced relative to each other. With that arrangement, only the entire belt pulley may alter relative to the cam element, or rotate on the shaft, while at the same time the one pulley can be axially displaced. By excluding relative rotary movement of the two mutually oppositely disposed pulley halves, relative to each other, wear of the belt is minimized. Such an arrangement is therefore particularly suitable in relation to belts into which chain links or elements are introduced. That arrangement also ensures that the chain elements which are in the belts do not take up an inclined position in the pulley groove.

In a further embodiment of the invention, it is advantageous that the belt-type transmission is provided with a rotatably mounted double pulley which is formed from two pulleys and which is provided with a central axially displaceable intermediate pulley formed from first and second pulley halves, wherein the two pulley halves are operatively interconnected by way of the cam elements and each corresponding pulley half is non-rotatably connected to the respective associated pulley half rotatably mounted on the shaft, by way of a spline arrangement, in such a way that the two belt pulleys can rotate relative to each other.

As the two inward belt pulleys are non-rotatably connected by way of the spline arrangement to the two associated outer pulley halves, that arrangement also provides that the amount of wear of the belts is kept at a low level as the respective oppositely disposed pulley halves cannot be rotated relative to each other. With that arrangement, only the one pulley rotates relative to the other adjacent pulley, while with increasing torque, the two central pulley halves can be urged away from each other so that as a result the frictional pressure is also increased and thus slippage is kept at a low level.

It is also advantageous if the axially displaceable pulley half carries on the rear side cam elements which are arranged coaxially with respect to the shaft and which are engaged with cam elements which are non-rotatably connected to the shaft, and the cam elements which are arranged on the shaft in coaxial relationship therewith are directly or indirectly non-rotatably connected to the shaft by way of a spline arrangement.

By virtue of the connection of the cam elements which are arranged coaxially with respect to the shaft, by means of the spline arrangement, that configuration therefore ensures that one pulley half does not rotate relative to the other pulley half. So that the cam elements may be more easily mounted on the shaft, it is advantageous for the individual cam elements to be disposed on a cam ring which is arranged on the shaft axially displaceably against the force of the spring and is non-rotatably connected to the shaft.

In a further embodiment of the invention, it is advantageous that the displacement travel of the cam ring is so great that the cam elements can be brought out of engagement. By virtue of using a relatively large travel movement, the cam elements can also be used as coupling elements and thus, in the event of a corresponding overload situation, they ensure that one or both pulley halves rotate on the shaft so that as a result damage to the belt is excluded under extreme overloading conditions. In that respect, it is advantageous if associated with each pulley half of a pulley are cam elements which can be brought into engagement with the cam elements which are non-rotatably disposed on the shaft.

In order to produce the necessary contact pressure between the belt and the pulley, when starting up the transmission, and thus to exclude the possibility of slippage when starting the working implement or machine, it is advantageous that the spring is provided between the rear side of the axially displaceable pulley half and the cam elements or the cam ring or between the cam elements or the cam ring and an arresting element which is provided on the shaft and which restricts the axial movement of the pulley half or the cam ring when same moves away from the associated other pulley half.

It is also advantageous if the first central pulley half is non-rotatably connected by way of a spline arrangement to the pulley half which completes the belt pulley while the second central pulley half is directly or indirectly rotatably mounted on the shaft.

By virtue of using two pulley halves which are provided on their faces with interengageable cam elements, that arrangement makes it possible in a simple manner to displace the pulley for example in an axial direction, in dependence on the torque forces, so that the inside surfaces of the pulley halves are pressed against the outward sides of the belt whereby the contact pressure force against the belt is thus also increased. That makes it possible to transmit a higher level of torque by means of the belt pulley, and thus keep slippage at a low level. For that purpose, it is advantageous for the one pulley half to be non-rotatably connected by way of a spline arrangement to the shaft on which the adjacent pulley half is disposed. In that way, it is only possible for the one pulley half to rotate slightly with respect to the other pulley half, that rotary movement being transmitted to the cam surfaces and thus the contact pressure to the cams which then cause axial displacement of the one pulley half. For that purpose, it is advantageous for the second central pulley half to be rotatably and axially displaceably mounted on a hub of the first central pulley half, with the second central pulley half being restricted in its axial movement by a securing ring upon an increase in the axial spacing relative to the first central pulley half. The use of a securing ring ensures that the central pulley half is not displaced too far towards one side, if for example the belt is subjected to a non-uniform loading.

So that the individual cam elements can be more easily replaced in the event of damage, it is advantageous for the cam elements to be releasably connected to the faces of the two pulley halves by way of bolts. It is also advantageous for the cam elements to be of a configuration which is in the form of a truncated pyramid in longitudinal section.

In another embodiment of the invention, it is advantageous for the mutually contacting cam surfaces of the cam elements to form an angle of between 35° and 45° with the associated outward side which bears against the face of the pulley half.

BRIEF DESCRIPTION OF THE DRAWINGS

The invention will be described in greater detail hereinafter with reference to drawings showing a number of embodiment in which:

FIG. 6 is a view of an individual cam element in section taken along line 8—8 in FIG. 8, which can be fixed to the face of the pulley half.

FIG. 7 is a view showing in a developed condition a number of interengaging cam elements, in section taken along line 7—7 in FIG. 5.

FIG. 8 is a plan view of the cam element shown in FIG. 5.

DESCRIPTION OF THE PREFERRED EMBODIMENT

Figure 1:
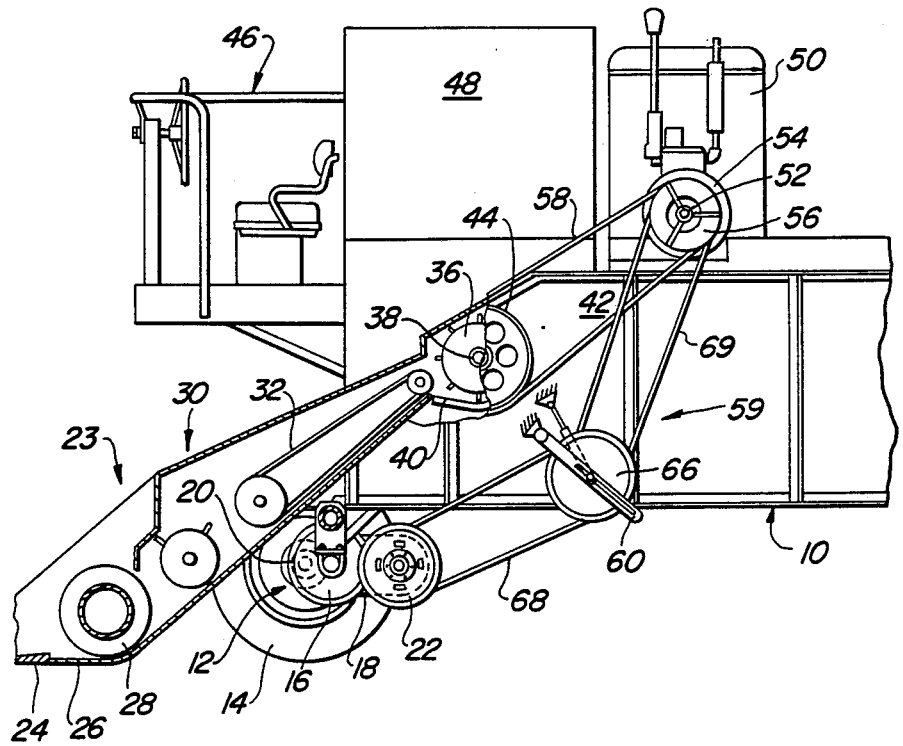
FIG. 1 is a view of part of a harvester, for example a combine harvester, including a steplessly adjustable belt-type transmission for propulsion drive.

In the drawing, reference numeral 10 denotes only part of a combine harvester having a front driving axle 12 on which support wheels 14 are disposed. For the sake of simplicity, only the right front wheel 14 is shown in the drawings. Disposed on the drive axle 12 are a differential transmission 16 and a transmission casing 18 which accommodates a change-speed transmission with which it is possible to set different speed ranges, originating from a shaft 20 which carries a driven belt pulley 22. The pulley 22 (see FIG. 1) may also be in the form of an adjustable, torque-dependent belt pulley 122 to 126, which is disposed on a shaft 71, as shown in FIGS. 10 through 14. In this case, the double pulley 66' does not need to be in the form of a torque-dependent double pulley. Disposed at the forward end of the combine harvester is a crop pick-up arrangement 23 comprising a cutter mechanism 24, a cutter mechanism floor 26 and an auger 28 by way of which the crop material which has been picked up is passed into an inclined conveyor housing 30 having an elevator conveyor 32. The elevator conveyor 32 passes the crop material to a threshing cylinder 36 which is mounted rotatably on a shaft 38. A concave 40 is disposed beneath the threshing cylinder 36. The shaft 38 of the threshing cylinder 36 is mounted in the side walls 42 of the combine harvester. Disposed on the outer end of the shaft 38 is a drive pulley 44 which is drivingly connected by way of a belt 58 to a pulley 54. The pulley 54 and a pulley 56 which is arranged therebeside are mounted on a shaft 52 of an internal combustion engine 50. The internal combustion engine 50 is disposed rearwardly of a grain tank 48 which is provided on the combine harvester 10. The operator station 46 is disposed in front of the grain tank 48.

The drive axle 12 of the combine harvester 10 and therewith the support wheels 14 are driven by a steplessly adjustable belt-type transmission 59. The transmission 59 (see FIGS. 1 and 2) comprises a pulley 56 which is disposed on the shaft 52, a double pulley 66 arranged on a pivotally mounted support arm 60 and formed from two V-belt pulleys, and the fourth pulley 22. The pulley 56 is drivingly connected by way of a belt 69 to the one V-belt pulley 62 (see FIG. 3) of the double pulley 66 while the second V-belt pulley 64 is drivingly connected by way of a belt 68 to the pulley 22.

Figure 2:
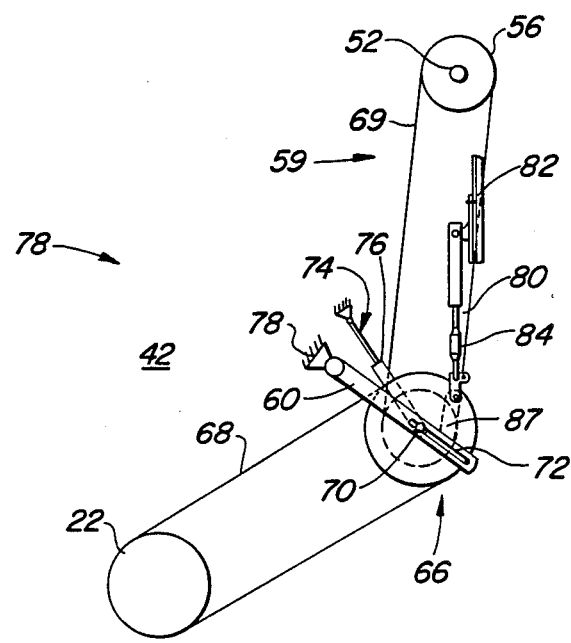
FIG. 2 shows the transmission of FIG. 1.

As can be seen from FIG. 2, the double pulley 66 is adjustable by means of a shaft 70 shiftable in a slot 72 provided in the support arm 60. The shaft 70 is engaged by a belt tensioning device comprising an adjustable tensioning bolt 74 which is connected at one end to the side wall 42 and which at the other end is rotatably accommodated in a tensioning sleeve 76. The sleeve 76 is fixedly connected to the shaft 70. By rotating the bolt 74, the double pulley 66 can be displaced in the slot 72 so that the belt tension required for the transmission 59 can be set. The support arm 60 is pivotally connected to a mounting 78 on the side wall 42. For the purposes of pivotal movement of the support arm 60, the arrangement has a hydraulically operable actuating cylinder 80 which is connected at one end thereof to a mounting 82 on the side wall 42 and which at the other end is connected by its piston rod 84 to a lever arm 87 fixedly connected to the support arm 60. The support arm 60 can be pivoted by retracting and extending the piston rod 84 of the actuating cylinder 80, whereby the effective diameters of the two V-belt pulleys 62 and 64 are correspondingly altered.

Figure 3:
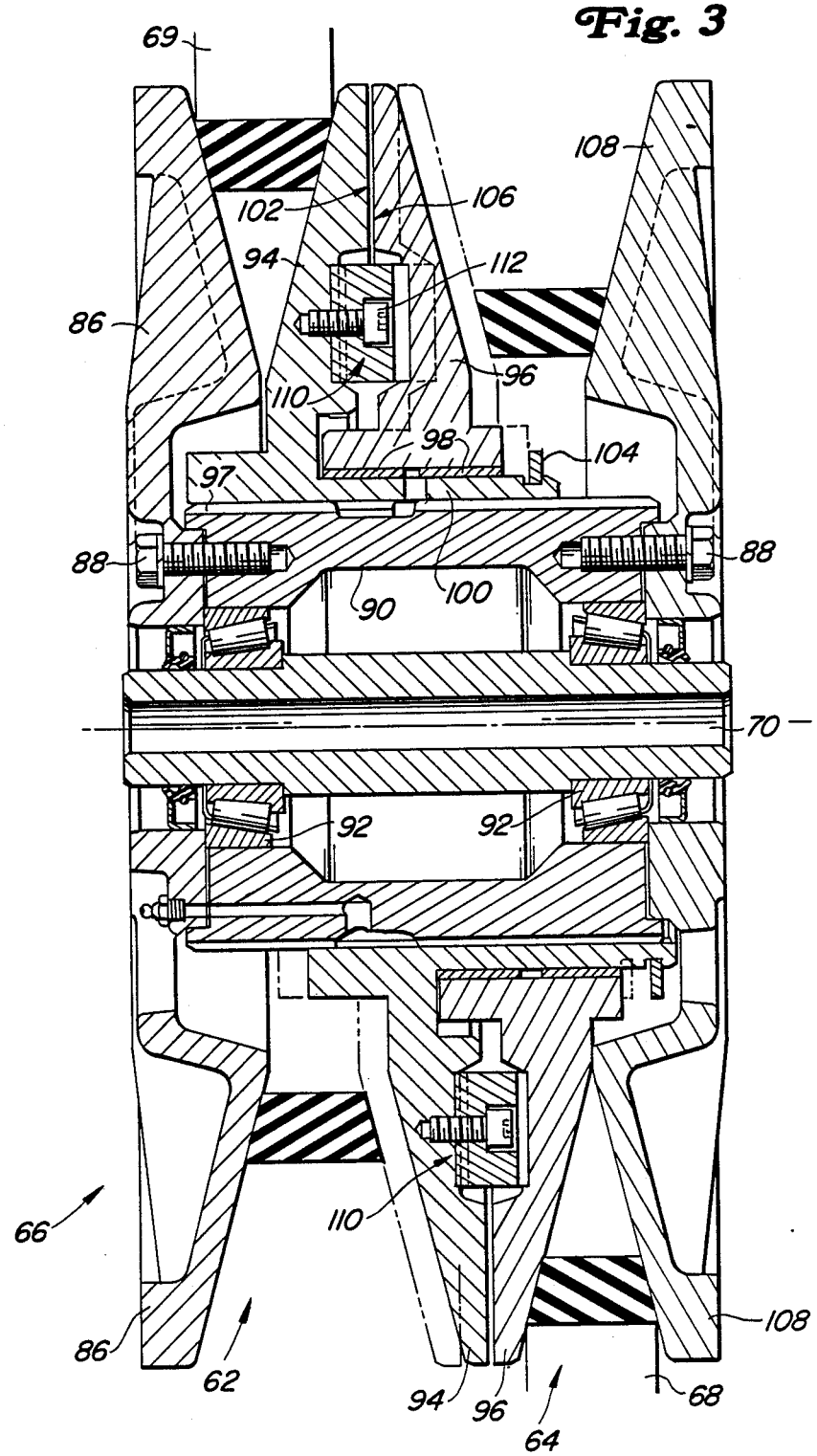
FIG. 3 is a sectional view of the double pulley arrangement.
Figure 4:
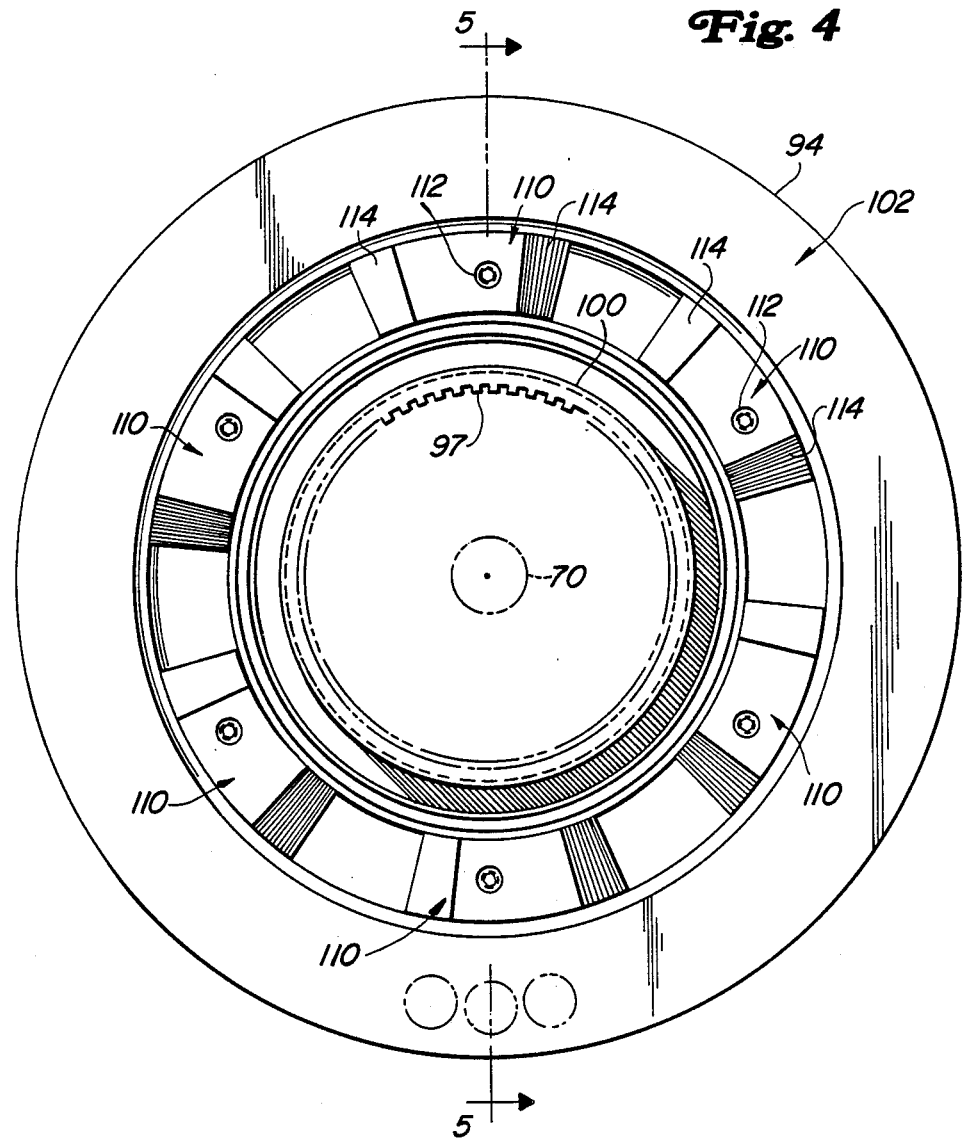
FIG. 4 is a side view of one half of the double pulley arrangement.
Figure 5:
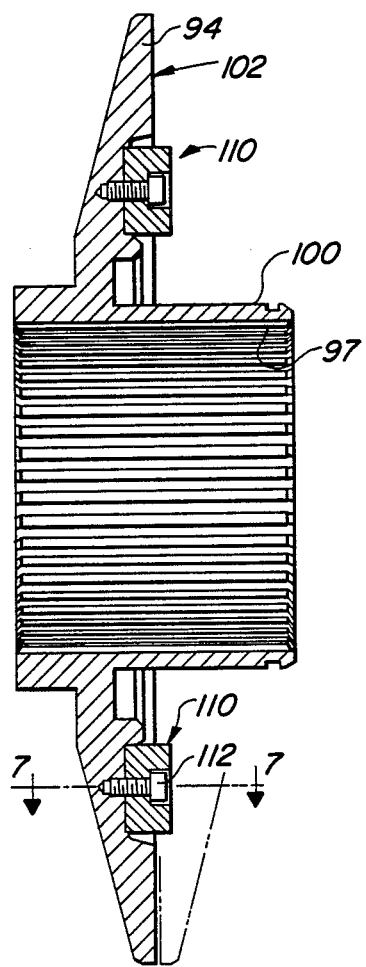
FIG. 5 is a view in section taken along line 5—5 in FIG. 4.

As already mentioned, the double pulley comprises the two V-belt pulleys 62 and 64 (see FIG. 3). The V-belt pulley 62 has an outer pulley half 86 which is non-rotatably connected to a hub 90 by way of bolts 88. The hub 90 is mounted on the shaft 70 by means of right-hand and left-hand roller bearing assemblies 92. The left-hand V-belt pulley 62 further comprises a central pulley half 94 which is non-rotatably connected to the hub 90 by way of a spline arrangement 97, while however being axially displaceable on the hub 90. Adjoining the central pulley half 94 is a second central pulley half 96 which is part of the V-belt pulley 64. The second pulley half 96 is mounted by means of a bushing 98 on a hub 100 which is fixedly connected to the first pulley half 94. In that way, the second pulley half 96 can be rotated and also displaced in the axial direction relative to the first pulley half 94. Axial displacement of the second pulley half 96 towards the left is restricted by the inward face 102 of the first pulley half 94 and axial displacement towards the right is restricted by a snap ring 104 which is provided on the outer end of the hub 100. The end face 102 of the left-hand pulley half 94 is at a small spacing from the end face 106 of the right-hand pulley half 96. The right-hand V-belt pulley 64 is completed by the outer fourth pulley half 108 which is non-rotatably connected to the hub 90 by way of bolts 112. So that a driving connection can be made between the left-hand V-belt pulley 62 and the right-hand V-belt pulley 64, the two central pulley halves 94 and 96 are drivingly connected together by numerous cam elements 110.

As shown in FIGS. 4 thru 8, the cam element 110 comprises a segment of a circular arc which with further cam elements 110 forms a circular arc which is arranged coaxially with respect to the shaft 70. The individual cam elements 110 are releasably connected by way of bolts 112 to the face 102 of the one pulley half 94 and the face 106 of the other pulley half 96. The cam elements 110 (see FIGS. 6 and 7) have inclinedly extending cam surfaces 114 which, with the face 102 of the pulley half 94 and the face 106 of the pulley half 96 respectively form an angle $\alpha$ which is preferably 40°. It is also possible however for the angle $\alpha$ to be of a value between 35° and 45°.

In operational use, the shaft 20 and therewith the wheels 14 are driven by means of the internal combustion engine 50 by way of the transmission 59. The tension in respect of the two belts 68 and 69, which is required to provide the drive, may be adjusted by displacement of the double pulley 66 on the support arm 60. In that way, in normal operational use, the drive moment may be readily transmitted from the one V-belt pulley 62 to the other V-belt pulley 64 by way of the double pulley 66. If, for example, the torque changes when the combine harvester 10 is climbing a gradient, then the torque also rises so that the two pulley halves 94 and 96 and therewith the corresponding cam elements 110 are displaced relative to each other. In that situation, as shown in FIG. 7, the lower cam element 110 slides along the upper cam element 110 so that the two cam elements are displaced in the axial direction as indicated by the arrow 116, with slight rotational movement about the shaft 70. As a result of such displacement, the pulley halves 94 and 96 are moved in the direction of the outward edges of the belts 68 and 69 and thus the contact pressure as between the edges of the belts and the inward surfaces of the pulley halves 94 and 96 is increased. The higher contact pressure means that a torque which occurs at a higher level may now also be readily transmitted. When the level of the torque drops, the two pulley halves 94 and 96 can move towards each other again so that the frictional pressure is reduced, in accordance with the falling value of the torque. In that way, the required belt tension, corresponding to the level of torque occurring, may be automatically adjusted, during operational use, using simple structural means, in particular at the double pulley at which the greatest amount of slip normally occurs.

The above-described belt-type transmission with the double pulley 66 of the advantageous configuration in question may also be readily used in all other working machines which are exposed to non-uniform kinds of loadings in order to provide in the optimum fashion the belt tension that is desired or necessary for the transmission of power. That makes it possible to reduce the amount of wear on the belts to a minimum as slippage at the pulleys can be kept at a low level.

Figure 9:
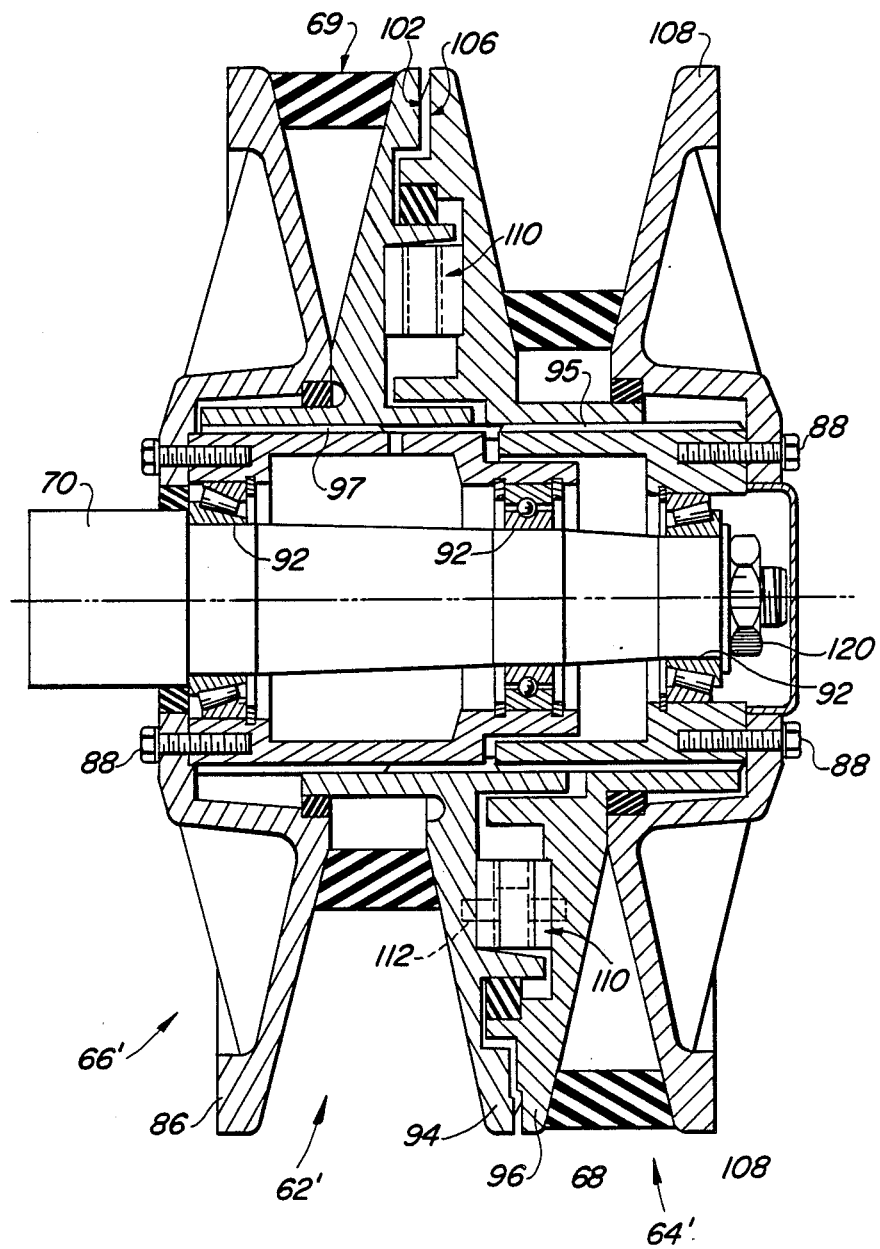
FIG. 9 is a further embodiment of a double pulley having an axially displaceable intermediate pulley formed from two pulley halves.

FIG. 9, similarly to FIG. 3, shows a double pulley 66' which however differs from the double pulley 66 shown in FIG. 3 in that the two pulley halves 94 and 96 are each connected to the respectively associated pulley half 86 and 108 by way of a spline arrangement 97 and 95, respectively. In that way, the pulley 62' which is formed from the two pulley halves 86 and 94 is mounted rotatably on the shaft 70, relative rotary movement of the two pulley halves 86 and 94 relative to each other being excluded by virtue of the spline arrangement 97. The same also applies in regard to the pulley 64' formed from the pulley halves 96 and 108. In the case of the pulley 64', the spline arrangement 95 which non-rotatably connects the pulley half 96 to the pulley half 108 also ensures that there is no relative rotary movement of the two pulley halves with respect to each other. As in the case of the double pulley 66, disposed between the two pulley halves 94 and 96 are cam elements 110 which, on an increase in torque, cause the two pulley halves 94 and 96 to be urged away from each other. When that occurs, the cam surfaces 114 of the respectively interengaging cam elements 110 slide against each other so that in that way the pulley formed from the pulley halves 96 and 94 rotates relative to the pulley formed from the pulley halves 96 and 108 until the necessary contact pressure between the belt and the pulley, or the necessary belt tension, has been set in dependence on the increased level of torque. The axial displacement of the two pulley halves 94 and 96 therefore ensures that the respective oppositely disposed pulley halves 86, 94 and 96, 108 do not rotate relative to each other. In that way, slip and wear can be reduced. That further ensures that the belt is not subjected to a torsional loading. That is particularly advantageous when using a belt in which chain links or elements are introduced thereinto. That arrangement therefore ensures that the chain links or members in the belt do not take up an inclined position when slip occurs and then, after a relatively short period of operation, cause such damage to the belt that it has to be replaced.

FIGS. 10 through 14 each show respective belt pulleys 122 through 126, wherein one pulley half is non-rotatably connected to the respective other pulley half by way of a spline arrangement 95 in such a way that, depending on the kind of loading, it can move towards or away from the other pulley half.

Figure 10:
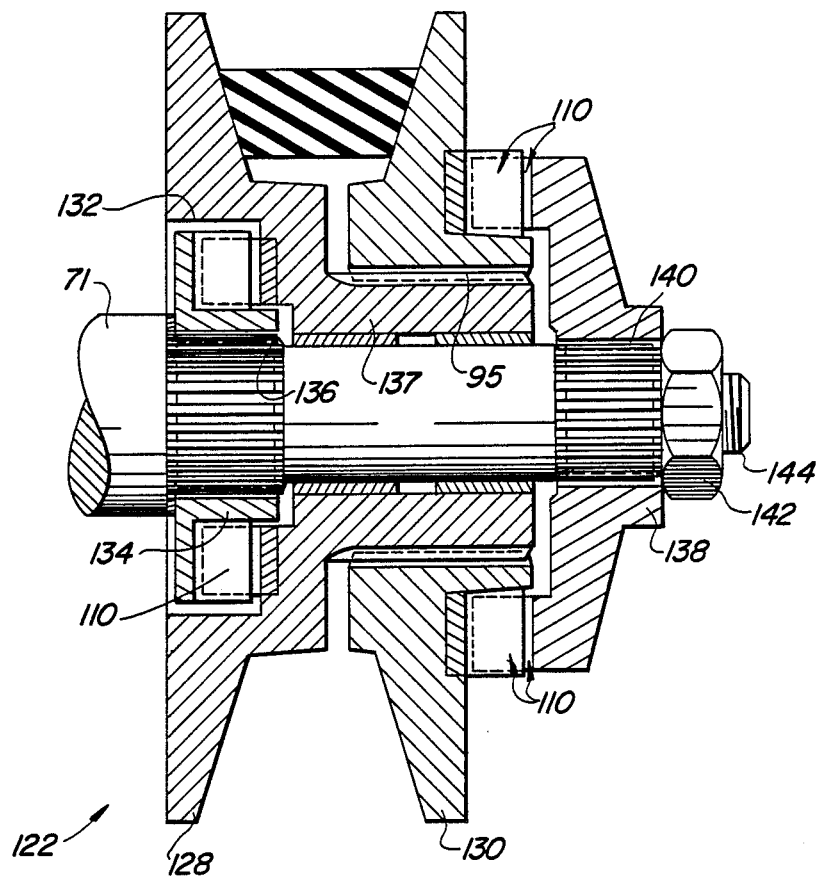
FIG. 10 shows a belt pulley with an axially displaceable second belt pulley half which is connected by way of a spline arrangement to the one pulley half, wherein both pulley halves are non-rotatably connected to the shaft by way of cam elements.
Figure 11:
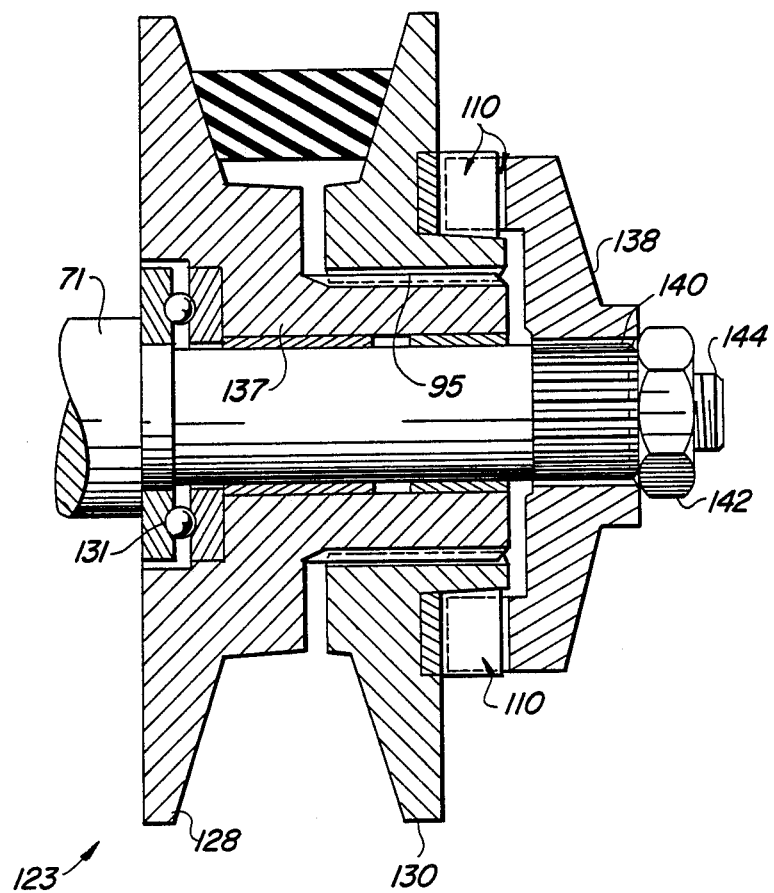
FIG. 11 shows a belt pulley with a pulley half rotatably mounted on the shaft and a pulley half which is axially displaceably mounted on the hub thereof and which is non-rotatably connected to the shaft by way of cam elements.

As can be seen in FIG. 10, the left-hand pulley half 128 is also provided at the rear side with a turned recess 132 therein, in which there are disposed a large number of cam elements 110 which are positioned coaxially with respect to the shaft 71 and which are engaged with oppositely disposed cam elements 110 which are arranged on a cam ring 134 and which are in coaxial relationship with respect to the shaft 71. The cam ring 134 is connected to the shaft 71 by way of a spline arrangement 136 which may be for example in the form of an involute-tooth or spline arrangement, in such a way that the cam ring 134 is displaceable in the axial direction. The pulley half 128 has a bushing 137 which is fixedly connected thereto and which is non-rotatably connected by way of a spline arrangement 95 to the pulley half 130 which is axially displaceable on the bushing 137. Disposed on the rear side of the pulley half 130 and also arranged coaxially with respect to the shaft 71 are cam elements 110 which are secured to a cam ring 138 disposed coaxially on the shaft 71. If for example the level of torque rises, then the two pulley halves 128 and 130 rotate somewhat relative to the cam ring 138 while the cam surfaces 114 of the cam elements 110 slide against each other. That increases the contact pressure against the belt and further increases the tension thereof.

The pulley 123 (FIG. 11) is slightly different from the pulley 122 shown in FIG. 10, one pulley half 128 being rotatably mounted by way of a thrust bearing 131 on the shaft 71. The axially displaceable pulley half 130 is drivingly connected to the shaft 71 by way of the cam elements 110, the cam ring 138 and a V-type spline arrangement 140. The spline arrangement 140 may comprise involute-type teeth which are arranged on the one hand in the bore in the cam ring 138 and on the other hand on the end of the shaft 70. The pulley halves in the embodiments shown in FIGS. 10 through 14 are secured in position by means of a nut 142 which for that purpose is screwed onto the screwthread 144 at the end of the shaft 71 and thus also restricts the axial movement of the cam ring 138.

Figure 12:
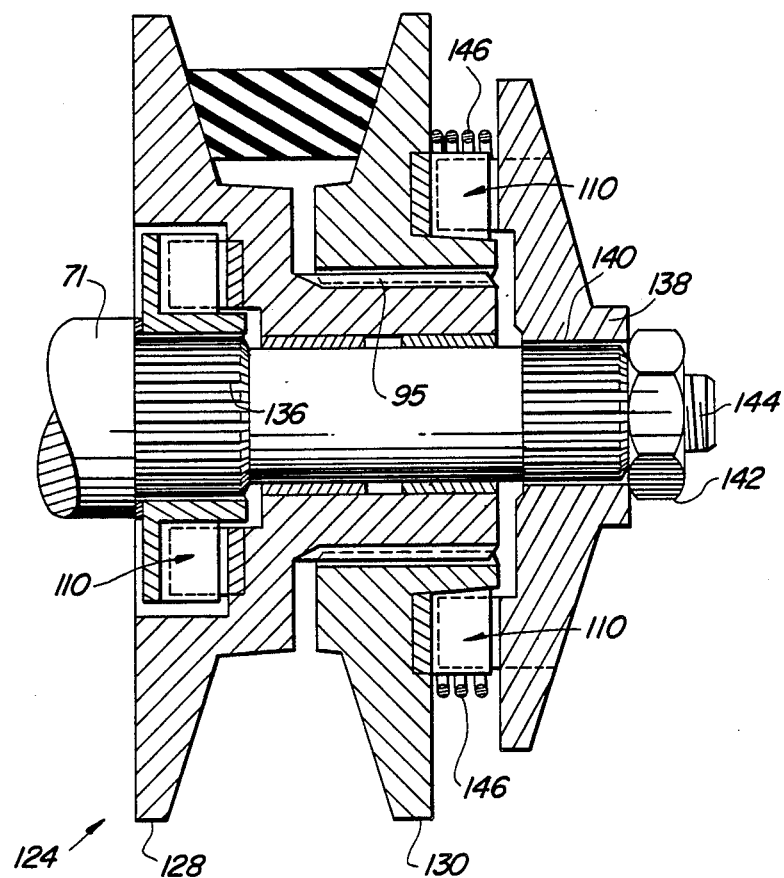
FIG. 12 shows a similar embodiment to that shown in FIG. 11, wherein an axially displaceable belt pulley is displaceable by way of spring elements.
Figure 13:
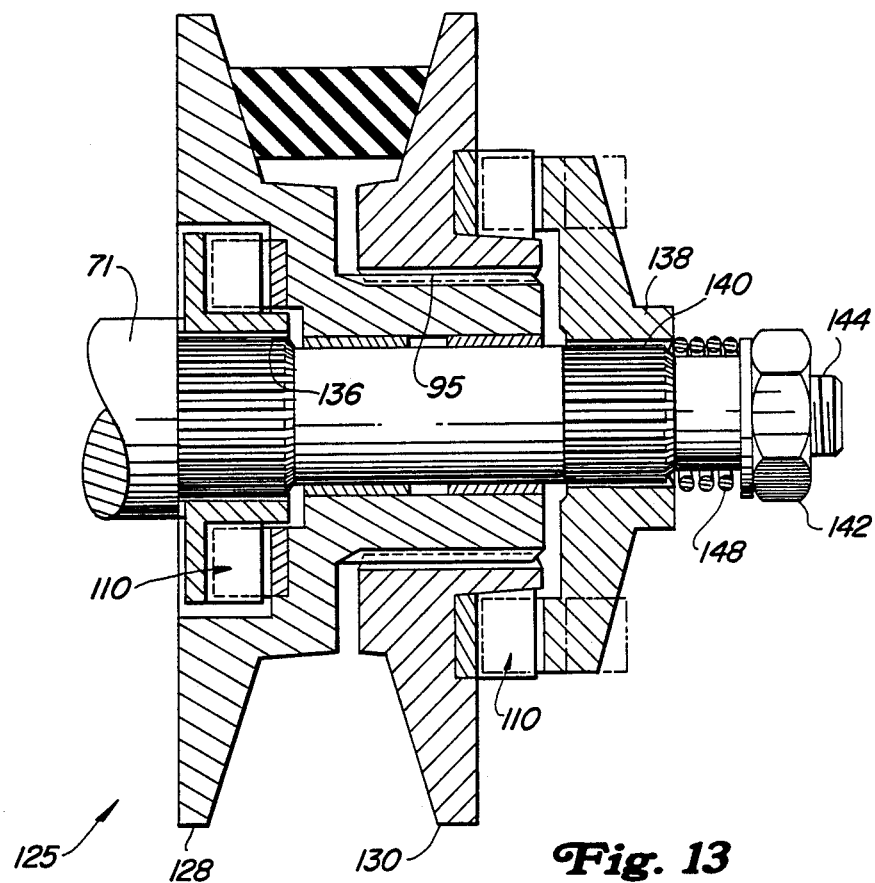
FIG. 13 shows a similar embodiment to that shown in FIG. 12, wherein the compression spring is provided between the outer end face of a cam ring and a nut which is disposed on a screw member.

As can be seen from FIGS. 12 and 13, a spring 146 may be provided between the inward end face of the cam ring 138 and the outward side of the pulley half 130, or a spring 148 may be disposed between the outward end face of the cam ring 138 and the nut 142. The purpose of the respective springs 146 and 148 is to urge the one pulley half 130 towards the outward pulley half 128 and thus, when the transmission 59 is starting up, to produce the necessary belt tension and the necessary rubbing pressure against the belt so that wear and also slip can be kept at a low level when starting up the transmission 59.

Figure 14:
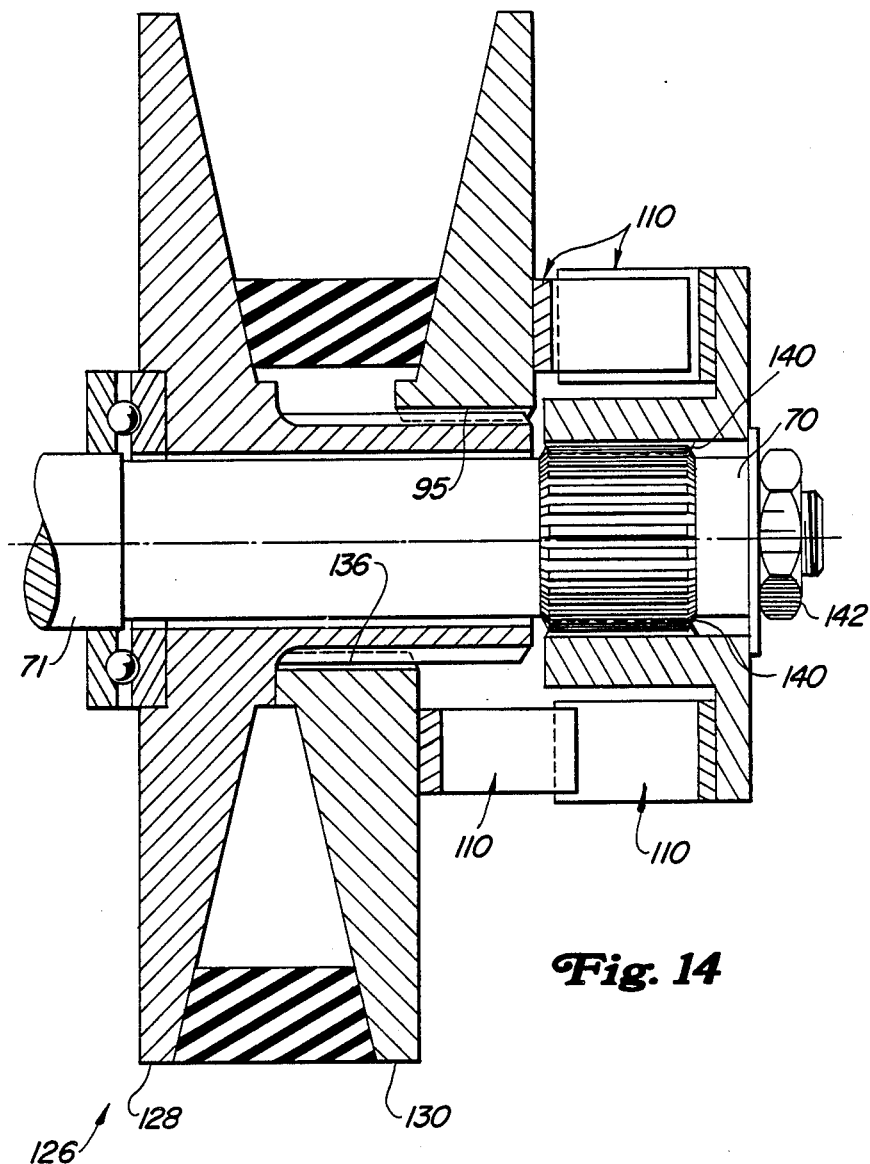
FIG. 14 shows a belt pulley with an axially displaceable pulley half, wherein the associated cam elements are so arranged that they can be brought out of engagement in order to rotate the one pulley half relative to the cam elements.

FIG. 14 shows a further pulley 126 which is also provided on the rear side thereof with cam elements 110 which are arranged coaxially with respect to the shaft 71 and which are engaged with cam elements 110 provided on a cam ring 138. The cam ring 138 is non-rotatably connected to the shaft 71 by way of a spline arrangement 140. The individual cam elements 110 are of a suitable width to permit a long displacement travel in respect of the axially displaceable pulley half 130. The travel distance of the pulley half 130 may also be so selected that the individual cam elements 110 are disengaged in order in that way to operate as a slip clutch, when loading peaks occur at the pulley, in order in that way to prevent damage from being done to the pulley or the other drive members.

We claim:

1. An infinitely variable belt-type transmission comprising:
    a drive pulley;
    a driven pulley;
    an intermediate shaft;
    means for supporting and shifting the intermediate shaft in a direction perpendicular to the shaft axis;
    first and second infinitely variable diameter pulleys mounted side-by-side on the intermediate shaft, each pulley including oppositely facing inner and outer pulley halves with opposed conical faces that form a groove of varying diameter according to the axial position of the inner pulley half relative to the outer pulley half;
    first and second drive belts respectively drivingly connecting the drive pulley to one of the variable diameter grooves and the driven pulley to the other variable diameter groove;

means interconnecting the outer pulley halves to prevent the outer halves from shifting axially relative to each other;

and cam means operatively interconnecting the inner pulley halves to shift the inner halves axially away from one another and toward the opposite outer half to increase the effective pulley diameters and thereby increase the tension in the belts in response to an increase in force transmitted from the first to the second variable diameter pulley.

2. The invention defined in claim 1 wherein the means interconnecting the outer pulley halves comprises a hub mounted on the shaft, the outer pulley halves being affixed to the hub.

3. The invention defined in claim 2 wherein the hub includes first and second portions rotatably connected to one another and to which the outer pulley halves are respectively attached, one of the inner pulley halves being splined to the first hub portion and the other inner pulley half being splined to the second portion and rotatable relative to first portion.

4. The invention defined in claim 2 wherein one of the inner pulley halves is splined to the hub for rotation therewith and axial shifting thereon, the other inner pulley half being both axially shiftable and rotatable relative to the hub.

5. The invention defined in claim 4 wherein said one inner pulley half includes an axially extending hub member and the other inner pulley half is journalled on said hub member.

6. The invention defined in claim 2 wherein the hub is rotatably mounted on the shaft through bearing means.

7. The invention defined in claim 2 wherein the cam means includes a first annular cam member attached to one inner pulley half and having cam surfaces inclined relative to a plane normal to the shaft axis and a second annular cam member attached to the other inner pulley half and having inclined cam surface engaging the cam surfaces of the first cam member.

* * * * *